Patented Dec. 14, 1943

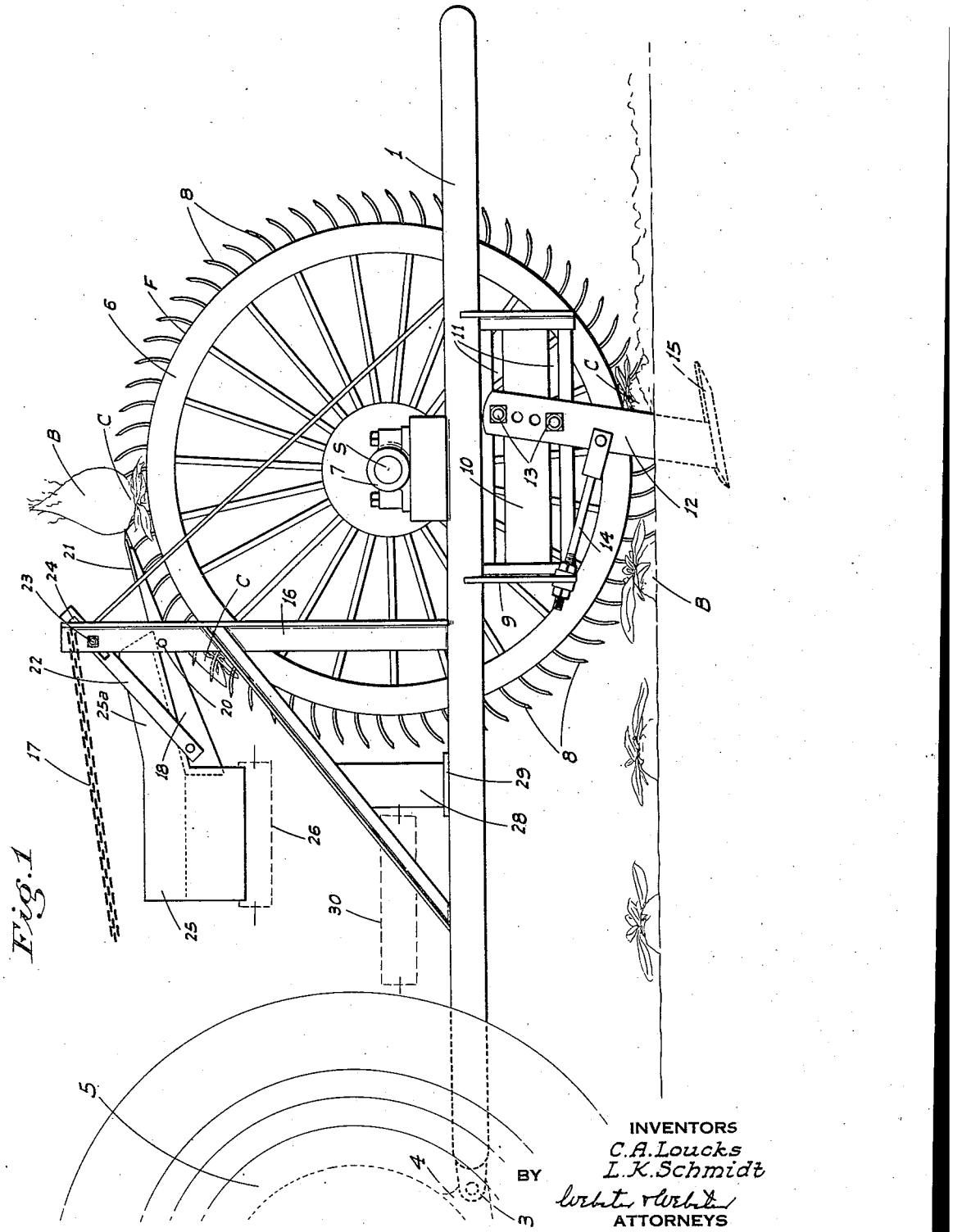

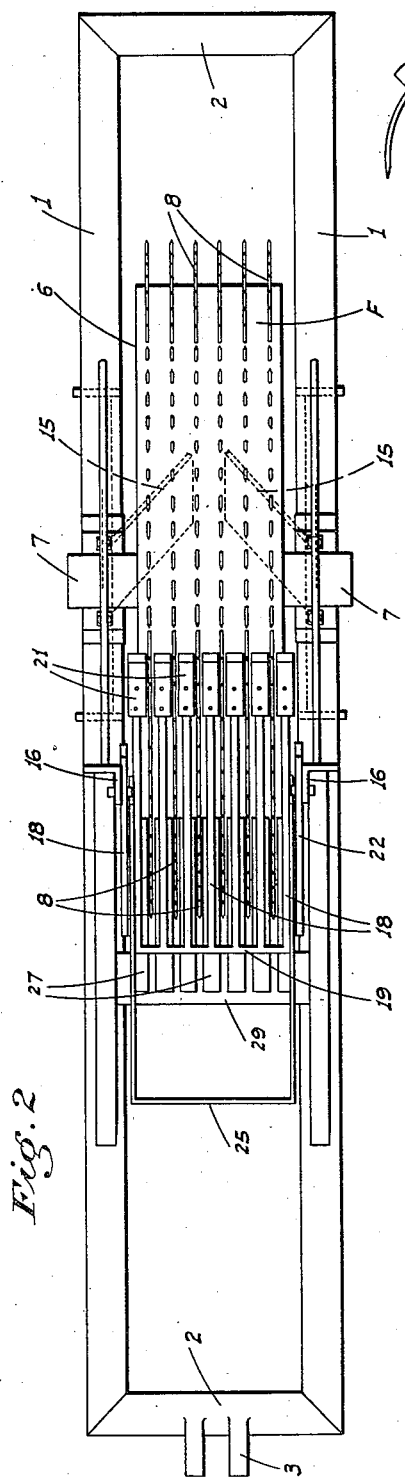
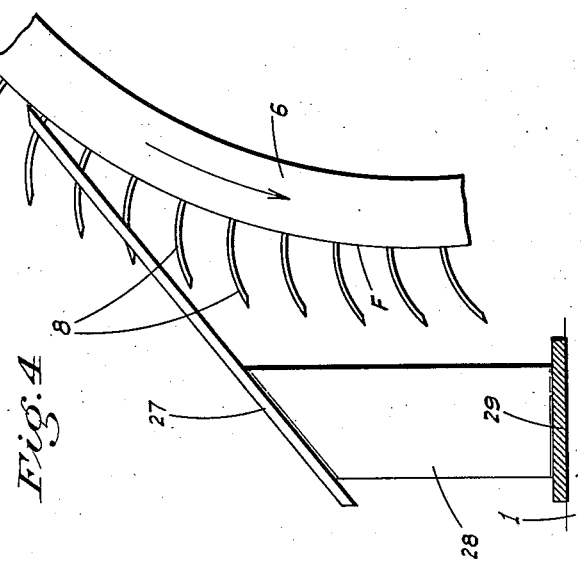
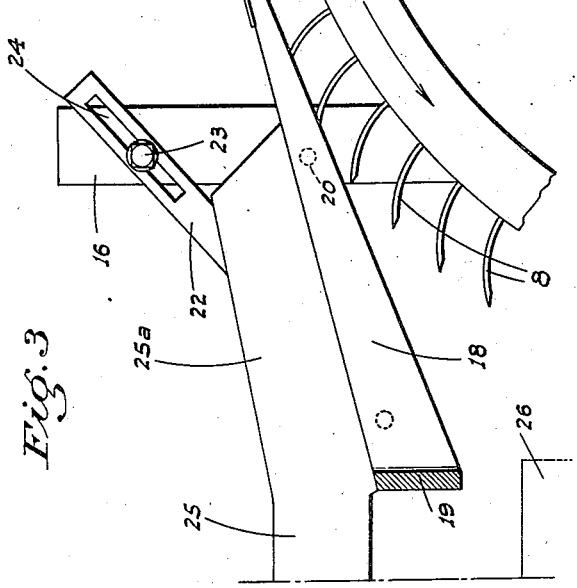

2,336,623

UNITED STATES PATENT OFFICE 2,336,623

BEET LIFTING AND TOPPING IMPLEMENT

Claude A. Loucks, Walnut Grove, and Lloyd K. Schmidt, Rio Vista, Calif., assignors of twenty-one and one-fourth per cent to Claude A. Loucks, Walnut Grove, thirty-six and one-fourth per cent to Lloyd K. Schmidt, Rio Vista, twenty-one and one-fourth per cent to George P. du Bose, Stockton, and twenty-one and one-fourth per cent to Albert M. Jongeneel, Walnut Grove, Calif.

Application October 9, 1942, Serial No. 461,402

3 Claims. (Cl. 55—106)

This invention relates generally to a beet harvesting implement, and in particular the invention is directed to, and it is our principal object to provide, a unique beet lifting and topping implement.

A further object of the invention is to provide a beet lifting and topping implement which includes, in novel combination, a tractor drawn frame, and a ground engaging wheel journaled on said frame and having circumferential rows of spaced spikes projecting from the wheel face for impaling and lifting beets over which the wheel passes; the implement including a beet topping unit associated with the wheel clear of the ground, but in a position to top beets impaled on and lifted by said spikes.

An additional object of the invention is to provide a beet lifting and topping implement, as in the preceding paragraph, which includes plows mounted in connection with the frame and engaging in the earth so as to loosen the same and assist in lifting the imbedded beets impaled on the spikes of the advancing wheel; said plow being disposed to effect such action shortly after the spikes are impaled into the beets but before elevating movement of said spikes.

It is also an object of the invention to provide a beet lifting implement which includes a spiked ground engaging wheel; the spikes projecting outwardly from the face of the wheel with a curve opposite to the direction of rotation, such curve being on a progression so that the spikes enter the beets with a smooth, non-tearing action.

A still further object of the invention is to provide an improved beet lifting and topping implement which includes in combination with a supporting frame and a ground engaging wheel having spikes projecting from the face thereof, a beet topping unit and a top stripping unit disposed in cooperating relation to the wheel spikes; said beet topping unit and top stripping unit being disposed to discharge into separate carry-off conveyors.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a side elevation of the implement.

Figure 2 is a top plan view of the implement.

Figure 3 is an enlarged fragmentary side elevation of the beet topping unit.

Figure 4 is an enlarged fragmentary side elevation of the top stripping unit.

Referring now more particularly to the characters of reference on the drawings, our improved beet lifting and topping implement comprises a horizontal longitudinally elongated frame, which includes side beams 1 disposed in transversely spaced relation and rigidly connected at their ends by cross beams 2. The forward cross beam includes a draft connection 3 adapted to couple with the drawbar 4 of a tractor indicated partially and diagrammatically at 5.

A relatively large diameter wheel 6 is journaled between the side beams 1 on a cross shaft S mounted at its ends in bearing blocks 7. The wheel 6 includes a flat, wide face F, on which is mounted a plurality of transversely spaced, circumferentially extending rows of outwardly projecting spikes 8; the spikes of each row being disposed in adjacent but equidistantly spaced relation. Each of the spikes is curved opposite to the direction of rotation of the wheel, said curve being on a progression so that said prongs will enter the beets on an arc and in non-tearing relation thereto.

Alongside the wheel 6, each side beam 1 is fitted with a depending, longitudinally extending bracket assembly 9, which includes a vertically disposed plate 10 formed with vertically spaced longitudinal slots 11. A depending plow standard 12 is engaged at its upper end in face to face relation with plate 10, and is secured to the same for adjustment lengthwise of the latter by means of bolts 13 which project through slots 11. A tension rod 14 connects between the standard intermediate its ends and the forward end portion of the bracket assembly 9; the rod 14 being adjustable lengthwise to correspond to the position of adjustment of the standard on the plate 10.

At their lower ends, the standards 12 are each fitted with a single wing plow 15; the plows 15 being disposed slightly rearwardly of the vertical center line of the wheel axis. These plows slope inward in their transverse plane and longitudinally converge upwardly and rearwardly, being spaced somewhat at adjacent ends.

Vertical posts 16 are mounted on the side beams 1 intermediate the ends of the latter and slightly ahead of the wheel axle 7; these posts being suitably braced as shown. The upper ends of the posts are connected with lift chains 17 which connect in implement lifting relation to power mechanism (not shown) on the tractor.

A beet topping unit is mounted in connection with the upstanding posts 16 and comprises the following:

A plurality of parallel, transversely spaced fingers 18 are secured together at one end in unitary relation by a rigid cross member 19. Such unit projects between the posts 16 adjacent but above the wheel 6, and is pivoted as at 20 intermediate its ends to said posts 16.

The fingers 18 are spaced apart a distance such that the ends of said fingers adjacent the wheel are disposed between the rows of spikes. At such end, the fingers are fitted with removable knives 21 which likewise project between the rows of spikes and in a circumferential plane a predetermined distance inwardly of the outer ends of the latter. Links 22 connect with the finger assembly adjacent cross member 19 and thence extend at an upward slope to connection by bolts 23 with the posts 16; said links being slotted as at 24 to permit of tilting adjustment of the finger and blade unit so as to dispose the cutting blades 21 in the desired circumferential plane relative to projecting spikes 8.

At the end opposite the cutting blades 21, the finger unit is arranged with a hopper 25, which includes side wings 25a which extend alongside said finger unit some distance toward the cutting blades. The hopper 25 discharges into an endless conveyor, shown diagrammatically at 26, which extends transversely out from the implement for discharge into a truck or wagon traveling alongside.

Beyond and below the above described beet topping unit, there is mounted a top stripping unit, which comprises a plurality of chisel-like stripping bars 27 which extend between the rows of spikes to a point adjacent the face of wheel 6; said stripping bars being parallel and diverging from the wheel at an outward and downward slope. Each of the stripping bars 27 is supported by a separate vertical plate or standard 28, and said plates are rigidly secured at their lower ends on a base 29 mounted between the side beams 1 ahead of the wheel. Another endless conveyor, shown diagrammatically at 30, is mounted in receiving relation to the grate formed by stripping bars 27; said conveyor 30 projecting laterally out from the implement on the side opposite conveyor 26.

*Operation*

In operation, the implement is attached to a tractor in draft relation, and the chains 17 are released so that the wheel 6 rides the ground.

The tractor is then driven so that the wheel 6 travels a row of beets B. With advance of the tractor and the implement, the spikes 8 penetrate the top of each beet in the row; such penetration being accomplished without a tearing action, for the reason, as previously described, that the spikes are on a progression curve. A moment after the beets are impaled on the spikes, which occurs when the spikes are on approximately the vertical center line of the wheel axis, the plows 15 disturb the earth around the impaled beets and exert a lifting action thereon, which assures that the crown C of each beet is forced into substantial engagement with the face F of the wheel 6. This is advantageous, as it properly gauges the beets on the wheel for topping.

With continued advance of the wheel, the beets are lifted from the then disturbed ground, and are carried about on the wheel until they are inverted and reach the cutting blades 21. Thereupon, and with continued rotation of the wheel, the beets are topped by said blades; the beets falling into the hopper 25 and being carried off by the conveyor 26. The remaining crowns C of the beets are stripped from the spikes by the stripping bars 27, and such crowns when released from the spikes fall onto conveyor 30, which discharges them laterally of the implement.

As is apparent, the position of plows 15 can be adjusted lengthwise of the implement so that the earth disturbing and beet lifting action can be effected at the proper moment. Also, as the fingers 18 are adjustably mounted, the cutting blades 21 can be set to top the beets in the desired circumferential plane relative to wheel face F against which the crowns are forced. While the implement as herein described is of single-row type, the implement may be constructed for multi-row use by employing a plurality of spiked wheels mounted in axially spaced relation.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A plow assembly for a beet lifting implement which includes a frame having transversely spaced side beams, and a spiked ground engaging beet pick-up wheel journaled between the side beams; said plow assembly comprising rigid standards disposed alongside the wheel, in depending relation to said side beams, means securing the upper end portion of said standards in connection with corresponding side beams for adjustment vertically and horizontally, and plows mounted in connection with and extending laterally inwardly from the lower end portion of said standards, said plows sloping inwardly in their transverse plane and longitudinally converging upwardly and rearwardly to a termination at their rear ends in adjacent but spaced relation.

2. A plow assembly for a beet lifting implement which includes a frame having transversely spaced side beams, and a spiked ground engaging beet pick-up wheel journaled between the side beams; said plow assembly comprising rigid standards disposed alongside the wheel, in depending relation to said side beams, means securing the upper end portion of said standards in connection with corresponding side beams for adjustment vertically and horizontally, and plows mounted in connection with and extending laterally inwardly from the lower end portion of said standards, said plows sloping inwardly in their transverse plane and longitudinally converging upwardly and rearwardly to a termination at their rear ends in adjacent but spaced relation; said standard securing means comprising, for each standard, a vertical plate mounted on the corresponding side beam, the plate having parallel longitudinally extending slots therethrough in vertically spaced relation, the adjacent standard having a vertical row of holes therein spaced apart a distance equal to the spacing of said slots, said adjacent standard engaging the plate in face to face engagement and in intersecting relation to the slots with certain of the holes in register with said slots, and securing bolts extending through the slots and registering holes in the standards.

3. A beet lifting plow assembly as in claim 2 including an axially adjustable tension rod connected at its forward end with said standard securing means ahead of each standard, and projecting rearwardly to connection with the latter intermediate its ends.

CLAUDE A. LOUCKS.
LLOYD K. SCHMIDT.